E. M. SCHANTZ.
SERVICE TIME CHECKER.
APPLICATION FILED OCT. 22, 1917.
1,299,236.
Patented Apr. 1, 1919.
5 SHEETS—SHEET 1.
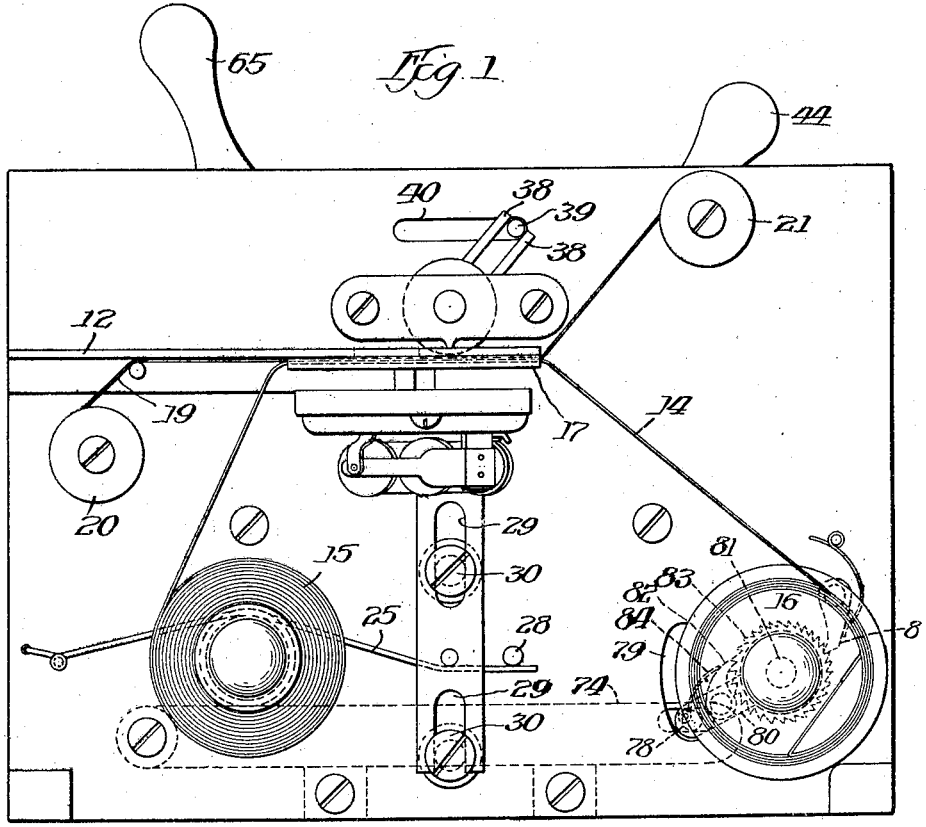
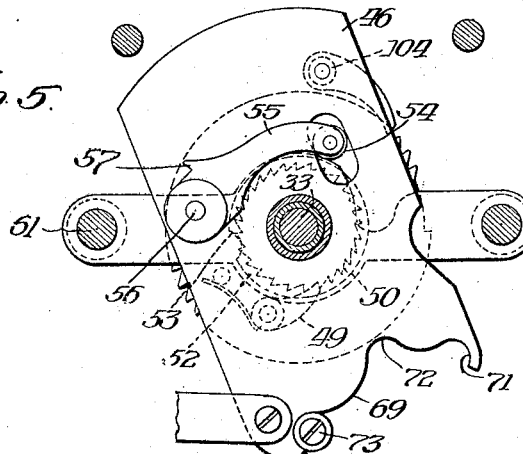

E. M. SCHANTZ.
SERVICE TIME CHECKER.
APPLICATION FILED OCT. 22, 1917.
1,299,236.
Patented Apr. 1, 1919.
5 SHEETS—SHEET 2.
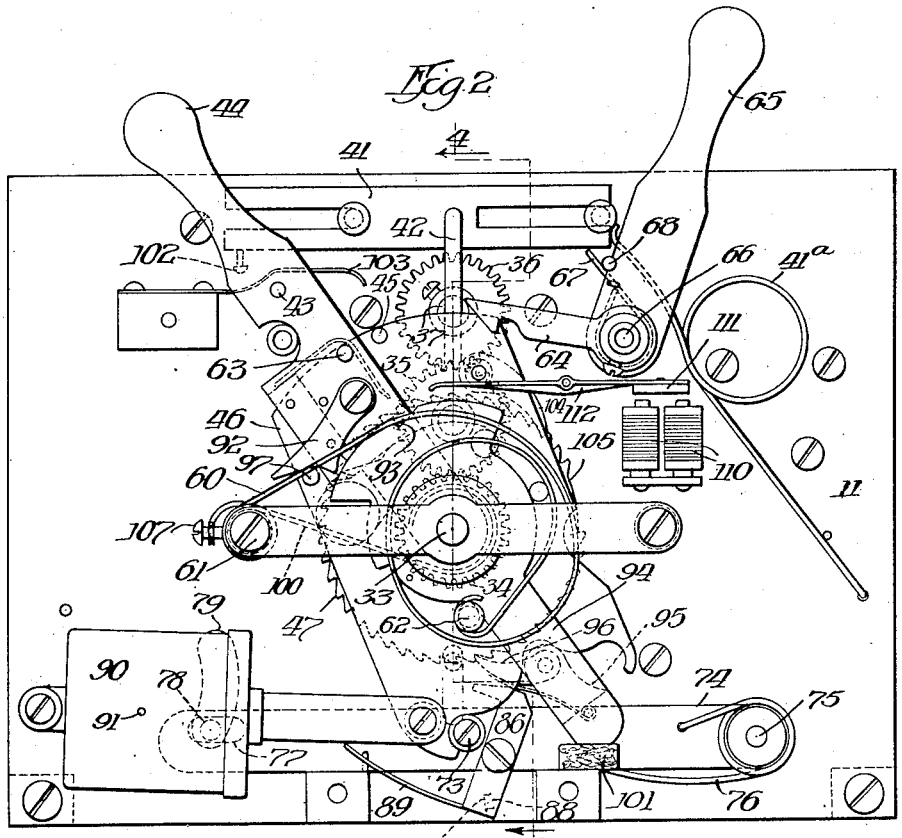
Fig. 2.
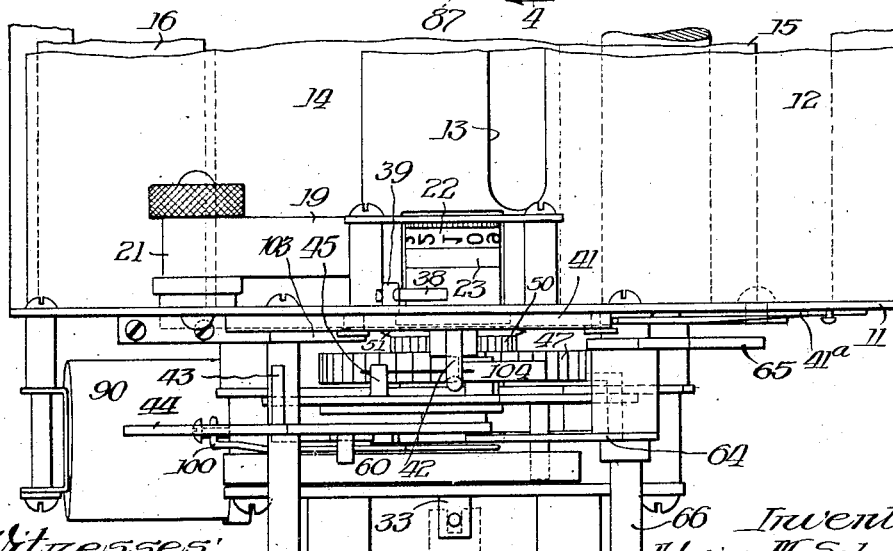
Fig. 3.
Witnesses:
Inventor
Edwin M. Schantz
By Wilkinson & Huxley
Attys E. M. SCHANTZ.
SERVICE TIME CHECKER.
APPLICATION FILED OCT. 22, 1917.
1,299,236.
Patented Apr. 1, 1919.
5 SHEETS—SHEET 3.
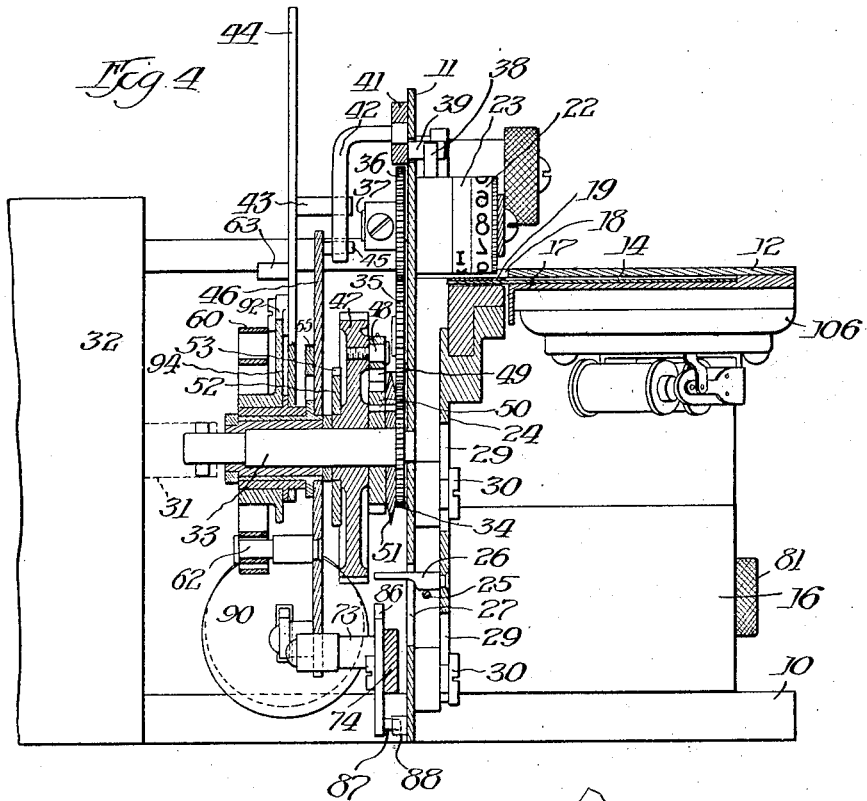
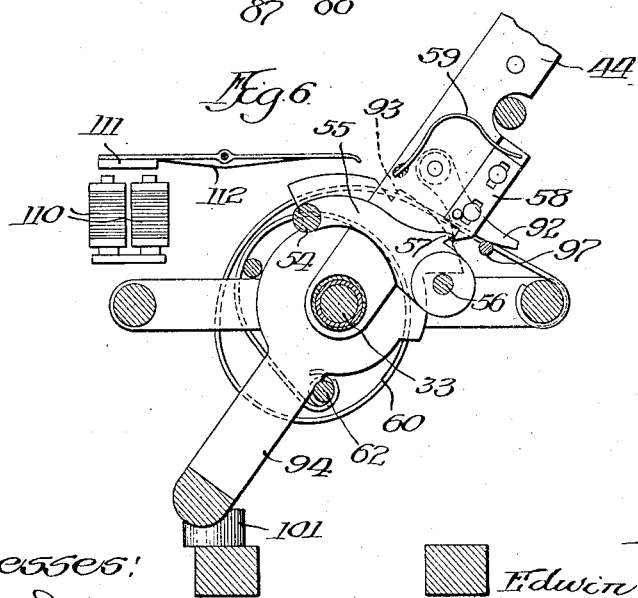

E. M. SCHANTZ.
SERVICE TIME CHECKER.
APPLICATION FILED OCT. 22, 1917.
1,299,236.
Patented Apr. 1, 1919.
5 SHEETS—SHEET 4.
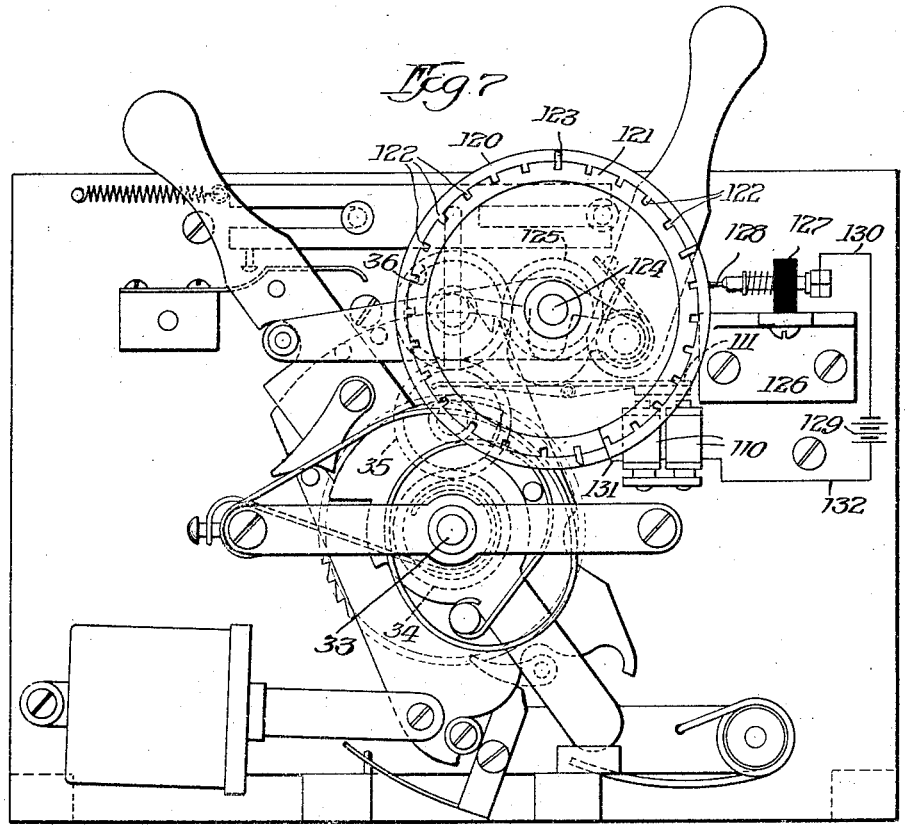
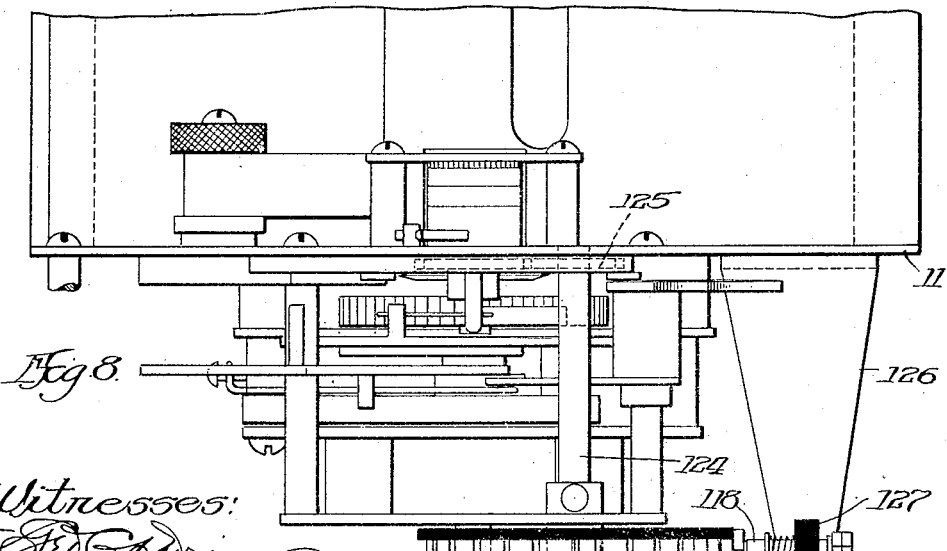

E. M. SCHANTZ.
SERVICE TIME CHECKER.
APPLICATION FILED OCT. 22, 1917.
1,299,236.
Patented Apr. 1, 1919.
5 SHEETS—SHEET 5.
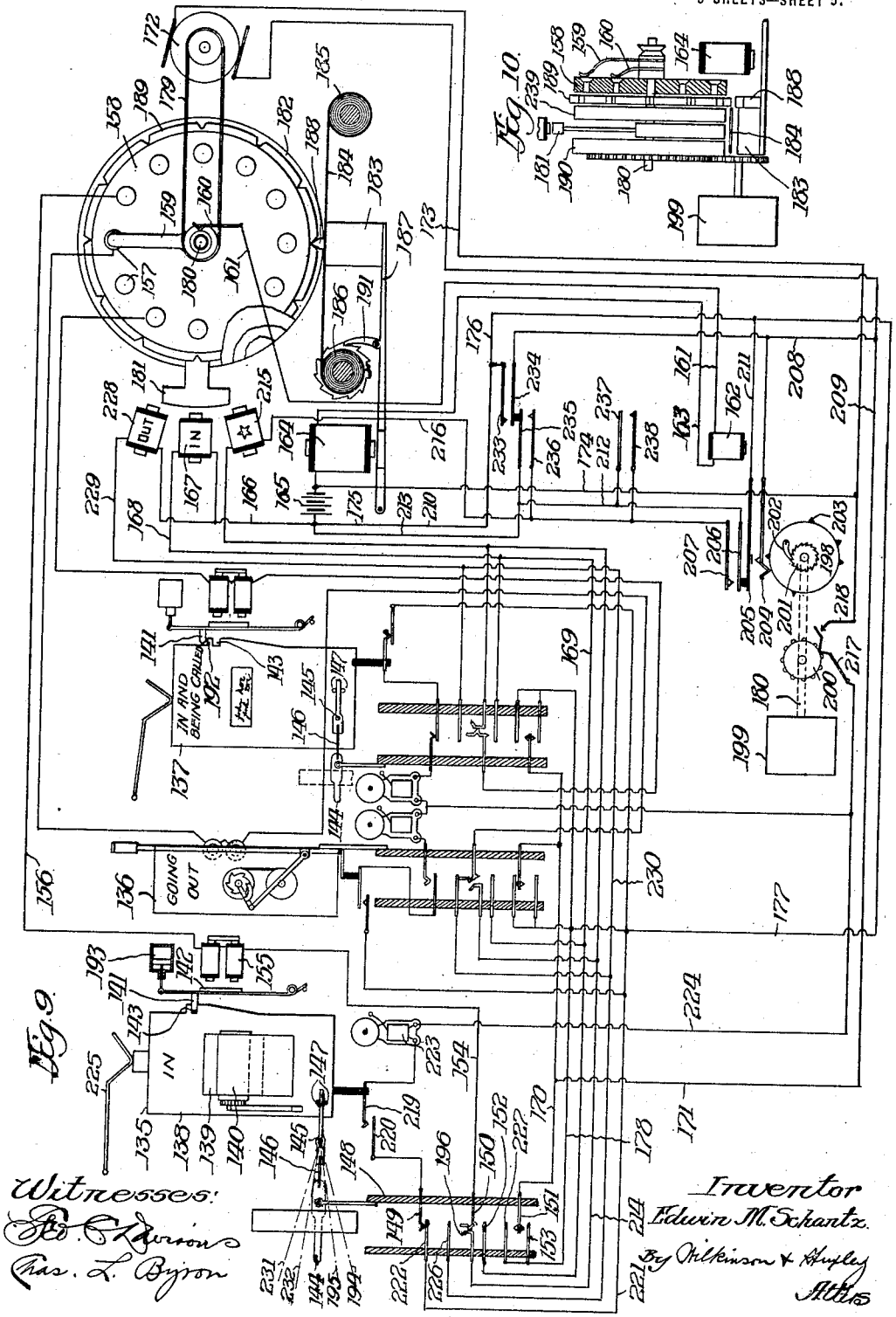

UNITED STATES PATENT OFFICE.

EDWIN M. SCHANTZ, OF CHICAGO, ILLINOIS.

SERVICE TIME-CHECKER.

1,299,236.    Specification of Letters Patent.    Patented Apr. 1, 1919.

Application filed October 22, 1917. Serial No. 197,813.

*To all whom it may concern:*

Be it known that I, EDWIN M. SCHANTZ, a citizen of the United States, and resident of Chicago, in the county of Cook and State of Illinois, have invented certain new and useful Improvements in Service Time-Checkers, of which the following is a specification.

This invention relates to service time checkers.

One of the objects of the invention is to make it possible to keep a positive time check on employees.

Another object is to call an employee at indeterminate times.

Another object is to call an employee automatically at indeterminate and irregular times to insure his being on duty or to increase the moral effect as to his obligation to duty.

Another object is to provide a service time checker which cannot be adjusted to the convenience of an employee and one which is adapted to meet the various requirements for successful commercial use.

Generally speaking, these and other objects are accomplished by providing in a device of the class described, signal means, and means for causing signaling action of said signal means at indeterminate times.

The invention is illustrated on the accompanying sheets of drawings, in which,

Figure 1 is a front elevation of my service time checker showing the time indicating and alarm mechanisms;

Fig. 2 is a rear elevation of the same time checker with the cover removed and showing the operating mechanism of the device;

Fig. 3 is a fragmentary plan view of the time checker;

Fig. 4 is a transverse vertical sectional view taken in the plane of line 4—4 of Fig. 2;

Fig. 5 is a fragmentary detailed sectional view of a portion of the mechanism shown in the position indicated by Fig. 2 of the drawings;

Fig. 6 is another detailed sectional view of some of the parts shown in Fig. 2 viewed from the side opposite to that shown in Fig. 2;

Fig. 7 is a rear elevation of my device showing a slight modification of the arrangement shown in Fig. 2;

Fig. 8 is a plan view of the arrangement shown in Fig. 7;

Fig. 9 is a diagrammatic view of another modification of my invention;

Fig. 10 is a further diagrammatic view showing some of the parts in side elevation for the sake of clearness; and Fig. 11 is a view of a record of indicating marks made by the service time checker with explanatory remarks adjacent.

The various novel features of my invention will be apparent from the following description and drawings and will be particularly pointed out in the appended claims.

So far as I am aware there are no time service checkers which cannot be manipulated to the advantage of employees. Heretofore it has been possible for one employee to check "in" and "out" for another. However, my device calls for the signature of the employee thereby preventing the above objectionable feature. My service time checker can in no wise be manipulated to the advantage of an employee. He is called automatically at indeterminate and irregular times whereupon a positive check may be kept on his services.

This service time checker includes a frame 10 (see Figs. 1, 2, 3, 4, 7 and 8) having a main vertical division wall 11 on one side of which is the time indicating and alarm mechanism and on the other side of which is the operating mechanism. Connected to one side of the main division wall 11 is a laterally extending shelf or hand rest 12 having a transverse elongated opening 13 past which a strip of paper may be drawn. The paper 14 is supplied in a roll 15 to the machine and is unwound from this roll and wound onto a second roll 16 in a manner to be described hereinafter, the paper passing from the supply roll 15 to a point between the hand rest 12 and a supporting plate 17 and then onto the receiving roll 16. The member 12 is also provided with another opening 18 past which an inked ribbon 19 may be drawn, the ribbon extending between a supply roll 20 and receiving roll 21 and moved in accordance with requirements. The strip of paper 14 passes under the inked ribbon 19, and directly over the inked ribbon is a time indicating wheel 22 and a disk 23 having on its periphery at the lower end thereof the following marks; the letter "I" meaning "in", the letter "O" meaning "out", and a "star", which is the mark indicated upon the strip of paper when the employee is called by the alarm or signal mechanism.

In order that the time that the employee is called and the other proper indicating marks may be stamped or printed upon the strip of paper 14, a platen 24 is provided which at suitable times automatically is forced upwardly with a snap action under the influence of a spring 25 which engages the under side of a projection 26, which extends through a vertical slot 27 in the wall 11, one end of the spring 25 normally engaging a stop member 28 on one side of the wall 11 to limit the effect which the spring 25 may have in snapping the platen 24 upwardly. The vertical extending portion of the platen is provided with a plurality of slotted guideways 29 which receive reduced portions of studs 30 for determining the path of movement of the platen.

The time indicating element 22 is actuated from the time shaft 31 of any suitable clock 32 through a main shaft 33 secured to the clock time shaft 31 and through operatively connected gear wheels 34, 35 and 36, the first gear wheel 34 being secured to the shaft 33 and the last mentioned gear wheel 36 being secured to a shaft 37 extending through the wall 11 and the disk 23 in which the shaft is journaled. The disk 23 is provided with two upwardly extending projections 38 between which is received a laterally extending pin 39 which extends through a horizontally arranged elongated slot 40 in the upper part of the frame 11 and is connected to a longitudinally extending slide member 41. It is apparent that when the slide member 41 is moved one way or the other, the projection 39 engages with one or the other of the projections 38 causing the disk 23 to be rotated and to bring one of the marks "I," "O" or the "*" opposite the platen 24 and inked ribbon 19. Secured to this slide 41 is a laterally and downwardly extending arm 42, the path of movement of which causes the same at a definite time to engage a pin 43 extending laterally from and secured to what I choose to call the "in" lever 44. The lower portion of this arm 42 also lies within the path of movement of a pin 45 extending from one side of and being connected to a plate 46 mounted for pivotal movement about the main shaft 33.

I have said that this time checker apparatus calls an employee at indeterminate times, or in other words, is operated by chance. Included in the operating mechanism is what I choose to call a chance wheel 47 loosely mounted upon the main shaft 33 and having a laterally extending projection 48 upon which is pivotally mounted a spring pressed pawl 49 which is pressed into engagement with a ratchet wheel 50 which rotates with the main shaft 33, a spacer 51 spacing the ratchet wheel 50 from the gear wheel 34 also secured to the main shaft 33. It is apparent therefore that when the main shaft 33 is driven in a clockwise direction, as viewed in Fig. 2, that the chance wheel 47 will be rotated in a clockwise direction through the pawl 49 engaging the ratchet wheel 50. A disk 52 rotates with the chance wheel 47 and has in its periphery a notch 53 which is adapted to receive a roller 54 mounted in one end of a lever 55 which is pivotally connected at 56 to the plate 46. The lever 55 has a projection 57 which under certain conditions is engaged by the projection on the lower end of a latch 58 (see Fig. 6), which is slidably mounted upon the inner side of the "in" lever 44. As shown in Fig. 6, a spring 59 is holding the latch 58 in operative connection with the projection 57 on the lever 55. The arrangement and positions of the various parts as shown in Fig. 6 is the same as shown in Fig. 2, it being noted that the parts are viewed from different sides in Figs. 2 and 6. If now the "in" lever 44, which is pivotally mounted about the shaft 33, is moved to the right, as shown in Fig. 2, and moved to the left as shown in Fig. 6, it is clear that the lever 55 likewise will be moved in the same sense thereby causing the plate member 46 also to be rotated clockwise, as viewed in Fig. 2. Such movement of the "in" lever and the plate 46 is resisted by a spring 60, one end of which is anchored to a post 61 and the other end of which is connected to a projection 62 extending laterally from the plate 46. If the "in" lever 44 is given its extreme movement to the right as viewed in Fig. 2, its projection 63 will pass under and be engaged by a latch 64 connected to what I choose to call the "out" lever 65, the latter of which is pivotally mounted upon a pin 66 and normally pressed into a latching position by a spring 67; the movement of the "out" lever 65 to the left and therefore the downward movement of the latch 64 is limited by a pin 68 which is located in the path of movement of the "out" lever.

The lower portion of the plate 46 is in the form of a cam 69 having two limiting shoulders 70 and 71 and also a recessed portion 72, the cam coöperating with a laterally projecting pin 73 upon a lever 74 pivotally mounted at 75 to the division wall 11. This lever 74 is pressed upwardly by a spring 76 in a manner such that the pin 73 at all times hugs the surface of the cam. Mounted in an elongated slot 77 in the free end of the lever 74 is a laterally extending pin 78 extending through an arcuate slot 79 in the wall 11. This pin 78 is formed upon an arm 80 pivotally mounted upon the shaft 81 of the paper receiving roll 16. The arm 80 carries a pawl 82 which is pressed into engagement with a ratchet wheel 83 of roll 16 by a spring 84. It is apparent therefore that when the free end of the lever 74 moves upwardly that the strip of paper 14 is unwound from the supply roll 15 and wound upon the receiving roll 16 a given amount, whereupon a portion of the paper unwritten upon is presented at the slot 13 in the hand plate 12. When the free end of the lever 74 moves downwardly the pawl 82 rides over the ratchet wheel 83 and a spring pressed pawl 85 prevents turning in an opposite direction of the receiving paper roll 16.

Pivotally mounted upon the lever 74 intermediate its ends is a latch 86, (see Fig. 2) the lower end of which is provided with a projection 87 which coöperates with a stationary cam member 88 extending laterally from the wall 11. When the lever 74 is raised the latch 86 is raised therewith. By means of the action of the spring 89 the projection 87 on the latch 86 moves up the left hand side of the cam 88 to throw the hooked part of the latch 86 out of the way of the projection 26 on the platen 24. When the lever 74 has been raised to a point where the projection 87 passes out of engagement with the cam 88, the spring 89 acts in a manner to throw the latch 86 over the projection 26 of the platen 24. When the lever 74 then is lowered the latch 86 also is lowered carrying with it the platen 24, the projection 87 on the latch 86 passing down the right hand side of the cam 88 (as viewed in Fig. 2) and when the projection 87 reaches the lower edge of the cam 88 the spring 89 acts in such a manner as to swing the latch 86 out of engagement with the projection 26 on the platen and the platen is snapped upwardly under the influence of its spring 25 causing the inked ribbon 19 and paper to be snapped upwardly, the former against the registering numerals and marks on the wheel 22 and disk 23 to make certain time and other indicating markings upon the strip of paper 14. In this connection it will be noted that a dash pot 90 is operatively connected with the plate 46 and provided with a vent 91 so positioned as to cause a relatively slow movement of the plate 46 when the pin 73 on the lever 74 is opposite the notch 72 in the cam 69 so that the pin 73 has sufficient time to move upwardly into the notch for the purpose of permitting the latch 86 to engage the projection 26 on the platen 24.

Pivotally mounted upon the "in" lever is a pawl 92, which under certain conditions passes into a notch 93, (see Fig. 2) formed in the upper circular portion of a lever 94 which is pivotally mounted over the main shaft 33. The lower end of this lever 94 is provided with an arm portion 95 running parallel with the main portion of the lever 94 and having in its free end a spring pressed pawl 96 which is held in engagement with the chance wheel 47. Normally the pawl 92 is held out of engagement with the notch 93 in the lever 94 by a pin 97 which extends laterally from the plate 46. Under certain conditions when the "in" lever 44 is moved to the left, as shown in Fig. 2, with the pawl 92 engaging the notch 93, the lever 94 will be raised a certain amount whereupon the pawl 96 will engage a portion higher on the chance wheel on its right side and when the "in" lever 44 is moved into its limiting position toward the left with the lever 94 in its elevated position, the pawl 92 will pass into engagement with the pin 97 causing disengagement between the "in" lever 44 and the lever 94, which hereafter I will call the spin lever, whereupon the spin lever will be moved downwardly into its normal position with a great degree of force under the influence of a spring 100 thereby giving the chance wheel a kicking impulse causing the latter to spin an uncertain amount, the lever 94 passing into engagement with a pad 101 and being brought to rest thereby.

When the employee comes to work in the morning, he checks in by means of moving the "in" lever to the right from the position which it occupies as shown in Fig. 2 of the drawing.

Several things happen when this "in" lever is moved to the right from the position shown in Fig. 2 of the drawings. They are as follows: The plate 46 is given a clockwise rotation due to the connection between the "in" lever and the plate 46 including latch 58 and lever 55 mounted upon the plate. The projection 45 on the plate 46 passes into engagement with the arm 42 on the slide 41 causing the "I" mark on the disk 23 to take its lowermost position so that when the platen 24 is snapped upwardly the "I" which stands for "in" will be indicated upon the paper 14. The movable electric contact 102 on the slide 41 is moved beyond the end of the stationary electrical contact 103. The lever 74 has been raised and lowered to feed the paper 14 a given amount and to cause the platen to be lowered and then snapped upwardly to print the "I" mark and the time on the paper. A spring pressed pawl 104, pivotally mounted upon the plate 46, has caused the chance wheel to be moved a given amount in a clockwise direction, the function of this particular movement of the chance wheel by the pawl 104 being to prevent an accidental tripping action of the whole mechanism, which otherwise might be the case. In this connection attention is called to the fact that a small portion of the periphery of the chance wheel is smooth. This smooth portion 105 of the chance wheel is fixed with respect to the notch 53 in the disk 52 so that the pawl 104 passes into engagement with the smooth spot 105 on the chance wheel 47 at the time that the roller 54 of lever 55 passes into the notch 53 in the disk 52. The function of the smooth spot 105 is to prevent a movement of the chance wheel causing a possible tripping of the device for calling the employee when he is registering "in." The last thing that happens when the "in" lever 44 is moved to its extreme right hand position as viewed in Fig. 2, is that said "in" lever is retained in such position by the latch 64 hooking over the pin 63 on the "in" lever.

With the parts in such a position the mechanism is set, indicating that the employee is on duty and under such set conditions the employee may be called automatically at any indeterminate time upon the tripping of the mechanism. The mechanism will be tripped when the roller 54 passes down into the notch 53 in the disk 52. A tripping of the mechanism therefore depends upon the actuation of the disk 52. This is done as mentioned hereinabove by a clock 32 through its shaft 31, main shaft 33, ratchet wheel 50, pawl 49 and chance wheel 47, which is directly connected to the disk 52. In this particular mechanism the main shaft 33 is given one revolution in every twelve hours, but in view of the fact that the chance wheel 47 may locate the notch 53 on the disk 52 at an indeterminate point after every spin of the chance wheel, it is never known at what time the trip of the mechanism will take place.

Let it be assumed that the disk 52 has been moved to the point where the roller 54 may pass into the notch 53, or in other words, to the point where the mechanism is tripped automatically. When the roller 54 passes into the notch 53 the projection 57 on the lever 55 passes out of engagement with the latch 58 on the "in" lever 44, whereupon the plate member 46 moves back to the position shown in Fig. 2, the "in" lever 44 however being retained by the latch 64 on the "out" lever 65. As the plate member 46 moves from its right hand to its left hand position as shown in Fig. 2, it permits the slide member 41 under the influence of its spring 41ª, to slide to the left a predetermined amount until the arm 42 engages the projection 43 on the "in" lever, the slide member 41 being permitted to move to the extent that the movable electrical contact 102 passes into engagement with the stationary electrical contact 103 thereby completing the circuit of a bell or other suitable signal 106 preferably mounted under the hand rest 12 and for giving a signal to the employee, calling for his signature on the paper lying within the confines of the slot 13 in the hand rest 12. This movement of the slide also moves the disk 23 to position the "*" on the disk 23 directly above the platen 24 so that when the platen is snapped upwardly a "*" will be indicated on the strip of paper. Also when the plate 46 moves to the position shown in Fig. 2 after being tripped the lever 74 goes through another cycle of movements causing an advance of the paper and also causing the platen 24 to be drawn down and then snapped upwardly, to cause the "*" to be printed upon the paper. As stated above, the sounding of the alarm calls for the signature of the employee.

After the employee has signed the paper he resets the machine. This is done by first shifting the "out" lever to the right to liberate the "in" lever, then the "in" lever is moved toward the left as shown in Fig. 2. In view of the fact that the pawl 92 at this time is free to fall into the notch 93 in the lever 94, the lower end of the lever 94 is moved in a counterclockwise direction as viewed in Fig. 2, causing the pawl 96 to take a higher grip upon the chance wheel 47 and as the "in" lever 44 is moved into its extreme left hand position the pawl 92 is raised out of the notch 93 by the pin 97 thereby tripping the lever 94 and subjecting it to the action of the spring 100 which causes a spinning in a clockwise direction of the chance wheel 47, making it impossible to tell at what time the mechanism again will be tripped after being reset for calling the employee to sign up another time. To complete the resetting of this mechanism, it is again necessary to move the "in" lever to the right as in the first instance to the point where the same will be retained in its extreme right hand position by the latch 64 on the "out" lever.

Among the elements of chance in this mechanism to render indeterminable the time at which the mechanism will be tripped and the signal sounded calling for the employee to sign, are the spinning of the chance wheel an indefinite amount by the spinning lever 94 in a manner hereinabove described. The extent of spinning of the chance wheel is also governed to a certain extent by the strength of the spring 100. I have provided an adjustable screw 107 which may vary the effect of the spring 100 upon the chance wheel thereby changing the extent of the spin of the chance wheel when same is given an impulse by the lever 94. Again when the "in" lever 44 is moved to the right and therefore the plate 46 likewise is moved to the right, the pawl 104 carried by the plate moves the chance wheel a certain amount thereby introducing a further element of chance. It will be appreciated, of course, that there may be any number of elements of chance and the more the better, while at the same time making the mechanism as simple as possible.

When the employee leaves his work for any reason whatsoever, whether or not he is checking out at noon or at night, or at some other time of the day, he merely swings the "out" lever 65 to the right thereby liberating as a unit the "in" lever and the plate 46 with all of the associated parts in an untripped condition. This movement of the "out" lever causes the slide 41 to move in a manner to present the letter "O" on the disk 23 adjacent the paper and the movement of the plate 46 permits the lever 74 to go through its cycle of movements in which the paper is advanced and stamped with an "O" by means of a snapping action of the platen.

So far I have described the mechanism only in connection with the automatic calling of the employee at indeterminate times. The employee also may be called at the will of the employer by means of closing an electric circuit 108 by means of a push button 109 or any other type of switch. This electric circuit includes the coils of a magnet 110 which may be suitably mounted upon the wall 11. When the magnet becomes energized by closing the switch an armature 111 at one end of a pivotally mounted lever 112 is drawn toward the magnet thereby raising the opposite end of the lever to raise the latch 58 thereby liberating the plate 46 whereby the signal is sounded and a time indication made on the paper.

In Figs. 7 and 8 I have shown a modification of my invention or more strictly speaking an addition to the arrangement disclosed in Figs. 1 to 6 inclusive. I have added an additional element of chance which takes the form of a wheel 120 of insulating material carrying a metallic ring 121 provided with a relatively large number of notches 122 into which a plurality of metal fingers 123 may be selectively placed. This disk of insulating material 120 is secured to one end of a shaft 124, to the other end of which is secured a gear wheel 125 which meshes with the gear wheel 36, which is actuated by the clock mechanism through the main shaft 33 and gears 34 and 35. Connected to the wall 11 is a bracket 126 carrying a block of insulation 127 to which is connected a stationary contact 128 which is adapted to be engaged by one end of the contact fingers 123 carried by the metal ring 121. When one of the fingers 123 engages the stationary contact 128, an electric circuit is completed from the battery 129 through conductor 130, stationary contact 128, one of the contact fingers 123, metal ring 121, conductor 131, windings of magnet 110, back to the battery through a conductor 132, whereupon the magnet 110 becomes energized to attract the armature 111 with the result that the mechanism is tripped to call the employee to sign up on the paper 14, as hereinabove fully set forth. This wheel 120 providing an additional chance element is to be turned any desirable amount by the inspector or employer at any time he may see fit and the pins or fingers 123 may be distributed in any manner whatsoever in the metal ring 121 to make the tripping of the mechanism through this agency indeterminate. The remaining parts disclosed in Figs. 7 and 8 are the same as shown in Figs. 1 to 6 inclusive.

In Figs. 9 and 10, I have shown a modification of my invention in which is indicated diagrammatically a plurality of time checkers connected in the same electrical system. I have shown but three of these time checkers, 135, 136 and 137; the first and last being shown in front elevation and the middle one being shown in side elevation. Any number of these devices may be connected in the system.

These devices are all alike, so a description of one only will be given in detail. Reference being had to the device 135 it will be seen to have what I choose to call a slide 138 having a slot 139 which when the slide is in its lowest position, as shown in connection with the device 137 exposes a roll of paper 140 for the signature of the employee. Normally, when the employee is on duty the slide is held in its raised position by a stop 141 carried by an armature 142 and which engages a notch 143 in the side of the slide. This slide 138 is controlled in some of its movements by a lever 144 being pivoted at 145 and having a resilient portion 146. The inner end of the lever engages between two projections 147 on the lower end of the slide whereby the latter may be raised and lowered.

When the employee goes out at night he moves the lever 144 upwardly thereby causing, after a series of automatic operations to be described later, a downward movement of the slide (see slide 137), at which time he registers on the paper as indicated. When the employee arrives at work in the morning he signs his name a second time (see slide 137) after which he moves the lever 144 downwardly exerting an upward pressure upon the slide. However, in view of the fact that the stop 141 at this time prevents an upward movement of the slide the resilient portion 146 of the lever 144 is placed under tension. When the lever 144 is pressed downwardly to register the employee "in", the contact support 148 moves downwardly and with it the contacts 149, 150 and 151 move downwardly. Contact 150 moves out of engagement with contact 196 and into engagement with stationary contact 152 and contact 151 passes into engagement with stationary contact 153 establishing two electrical circuits. From contact 150 a circuit is completed through conductor 154, slide magnets 155, conductor 156, one of the contacts 157 on contact disk 158, through contact arm 159, when the latter engages that particular contact 157, through brush 160, conductor 161, chance wheel magnet 162, conductor 163, platen magnet 164, battery 165, conductor 166, "in" magnet 167, conductor 168, conductor 169, to stationary contact 152, whereupon magnets 155, 162, 164 and 167 will be energized to accomplish results to be specifically set forth hereinafter. The other circuit referred to is the motor circuit from contact 151, through conductor 170, conductor 171, motor 172, conductor 173, conductor 174, battery 165, conductors 175, 176, 177 and 178 and stationary contact 153. As soon as this motor circuit is completed the motor 172 by means of a belt connection 179 drives a shaft 180 and thereby the contact arm 159 mounted on shaft 180. When the contact arm engages the contact 157 corresponding to the device registered "In", as mentioned hereinabove the slide magnet 155, chance wheel magnet 162, platen magnet 164 and "in" magnet 167 will be energized. The "in" magnet will be the first to respond and will cause the member 181 to take a position opposite the "in" magnet. This member 181 is pivotally mounted upon the shaft 180 and has a downwardly extending portion with an arcuate sector 182 on the periphery of which are markers "In," "Out" and a "*". As stated before, when the member 181 is drawn in the position shown by the "in" magnet the "in" mark appears above the platen 183 over the top of which passes a strip of paper 184 from a roll 185 and wound upon a roll 186. The platen 183 is carried by an armature 187 which is drawn upwardly when the magnet 164 is energized to cause the "in" mark to be stamped upon the paper 184. At the time that the platen is causing the mark to be stamped upon the paper the shaft 180 and thereby the arm 159 and all other members secured to the shaft are held stationary by a stop member 188 carried by the armature 187 and engaging a notch in the lock wheel 189. Also at the time that the platen causes the "in" mark to be stamped upon the paper, the time and the number of the device are stamped upon the paper due to the fact that the same paper is snapped up into engagement with a time disk 190 and number disk 239 also secured to the shaft 180. It will be noted that when the armature 187 is raised a pawl 191 advances the strip of paper 184. As mentioned above the slide magnets 155 are also energized causing the withdrawal of the stop 141 from the projection 192 on the side of the slide whereupon, under the influence of the resilient portion 146 of the lever 144 the slide is moved upwardly from a position corresponding to the one shown by slide 137 to the position shown by slide 138. The movement of the armature 142 in withdrawing the stop 141 is somewhat retarded by a dash pot 193 to permit the slide to move up lastly after the other automatic operations are performed. When the slide is moved into its uppermost position, the paper no longer is exposed to the employee. As soon as the lever 144 is liberated after moving into its lowermost position indicated by numeral 194 it snaps up into an intermediate position 195. In this connection attention is called to the fact that the employee holds the lever 144 until the corresponding slide moves upwardly which indicates that all other operations of the mechanism have been performed. When the lever 144 moves into the intermediate position 195 the circuit of the magnets 155, 162, 164, and 167 are broken by contact 150 moving out of engagement with stationary contact 152 and the motor circuit is also broken by contact 151 moving out of engagement with stationary contact 153 whereupon the is no further movement of the contact arm 159. At this point it is to be noted that the movable contact 150 when in engagement with the stationary contact 152 is out of engagement with the stationary contact 196. At this point it also may be mentioned that when the magnet 162 is energized it causes through its ratchet and pawl mechanism 197 a spinning movement of the chance wheel 198 to render indeterminate the time the employee will be called to sign up.

Operatively connected to the shaft 180 is a clock 199 which operates the former. Mounted upon this shaft is a toothed wheel 200 to cause every minute the completion of the bell circuit. Loosely mounted upon this shaft 180 is the chance wheel 198 which is actuated by the ratchet 201 and pawl 202.

When any one of the insulated projections 203 on the chance wheel 198 passes into engagement with the contact member 204 it causes the contact member 204 to engage contact member 205 and also causes contact 206 to engage contact 207, whereupon the motor circuit is completed from contact 204 through conductor 208, conductor 209, motor 172, conductor 173, conductor 174, battery 165, conductor 210, conductors 176 and 211, to contact 205. This causes the motor to actuate the arm 159 over the contacts 157. At the same time a circuit is completed from contact 206 through conductor 212, conductor 213, battery 165, magnet 164, conductor 163, magnet 162, conductor 161, brush 160, contact arm 159, the proper corresponding contact 157, conductor 156, slide magnet 155, conductor 154, contacts 150 and 196, conductor 214, "star" magnet 215, conductor 216, contact 207, back to contact 206, which causes first the member 181 to be attracted to a point adjacent the "*" magnet to adjust the "*" on member 182 with respect to the platen. Then the magnet 164 causes the platen to rise to hold the contact arm 159 stationary and to print the "*", time of call, and number of device calling upon the strip of paper 184. The slide may then fall from a position shown by 138 to the position shown by slide 137 due to energization of magnet 155. When the slide falls, assuming that it is slide No. 138, its contact 219 passes down into engagement with a contact 220 to partially complete the bell circuit. In the meantime or immediately thereafter the bell circuit is completed by the tooth wheel 200 forcing the contact 217 to move into engagement with the contact 218. Tracing the bell circuit from contact 218 it includes conductor 174, battery 165, conductors 175, 176, 177, 221, contact 222, contact 149, contacts 220 and 219, the bell 223, conductor 224 and contact 217, back to contact 218. This causes the bell to ring and calls the particular employee who is associated with this particular check device. It then becomes necessary for the employee to sign his name and again move the lever 144 downwardly to cause the slide to move upwardly as hereinbefore fully described. The slide in each case is assisted in its downward movement by a suitable spring 225.

In going out the employee moves the control lever upwardly causing the contact 150 to engage with contact 226 and contact 151 to engage contact 227. When contact 151 engages contact 227, the motor circuit is completed from contact 151 through conductors 170, 171 and 209, motor 172, conductors 173, 174, battery 165, conductors 175, 176, 177, 178, contact 227, back to contact 151. This causes the contact arm 159 to move into engagement with the contact 157 corresponding to the particular check device being operated. At the same time when contact 150 passes out of engagement with contact 196 and into engagement with contact 226, the circuit of the magnets is completed from contact 150 through conductors 154, slide magnet 155, conductor 156, one of the contacts 157, contact arm 159, brush 160, conductor 161, chance magnet 162, conductor 163, platen magnet 164, battery 165, conductor 166, "out" magnet 228, conductor 229, conductor 230, contact 226, back to contact 150 whereupon the member 181 will be drawn adjacent the "out" magnet 228 to present the "out" mark adjacent the platen 183. Armature 187 will then move upwardly to hold the contact arm 159 from further movement and cause the platen to stamp "Out" on the paper 184, the time thereof and the number of the device. The armature 142 will cause the withdrawal of stop 141 whereupon the slide will fall into its lower position under the influence of spring 225 at which time the operator will write his name on the paper 140 provided opposite the slot. When the operator releases his hold upon the lever 144 it moves from its extreme upward position 231 to a second intermediate position 232. The slide remains in its down position until the employee comes to work in the morning when he signs up and moves the lever 144 downwardly.

The operation above described is entirely automatic.

If it is the wish of the employer to operate the calling device at any desired time at will, he may do so in two ways. The first way is to press contacts 233 and 234 into engagement with each other and contacts 235 and 236 into engagement with each other whereupon the motor 172 will be started for actuating the arm 159 to move into engagement with the contact 157 corresponding to the device of that particular employee. At the same time by means of contacts 235 and 236 being in engagement with each other the star magnet, slide magnet, platen magnet and chance wheel magnet will all be energized to perform the usual functions hereinabove described and the bell circuit will be completed at contacts 217 and 218 for sounding the signal. The second way the employer may call any particular employee at will is done without the use of the motor. However, in this case the employer is first to move the contact arm 159 by hand to the particular contact 157 corresponding to the device of the particular employee, then the employer will press the contacts 237 and 238 into engagement with each other whereupon the same magnet circuits will be closed for performing the functions hereinabove described and the bell will be sounded by the closure of contacts 217 and 218.

It will be appreciated that any number of devices may be used in the system, it being necessary however to provide one contact 157 on the disk 158 for every device used in the system.

In Fig. 10 I have shown somewhat diagrammatically the central control organization of the system. The clock 199 is shown as driving the wheel 200 to close the bell circuit, the chance wheel 198 for calling the employee at an indeterminate time, the time disk 190 for indicating the time on the strip of paper 184, the disk 239 indicating the number of the device and therefore the number of employees called, the lock wheel 189 by means of which the contact arm 159 is held stationary when the platen is raised for causing printing upon the paper, the member 188 coöperating with the lock wheel. The disk 158 is mounted over the shaft but not driven by the same. This disk 158 is held stationary in any suitable manner and carries the contacts 157. The contact arm 159 is shown as coöperating with contacts on disk 158 and the brush 160 is also shown.

It is apparent that there may be various modifications of my invention as herein particularly shown and described, and it is my intention to cover all such modifications which do not depart from the spirit and scope of the invention as set forth in the following claims.

I claim:

1. In a service time checker, the combination of signal means, and chance means whereby the signal will be given at an indeterminate time for maintaining a time check on service.

2. In a service time checker, the combination of signal means, chance means whereby the signal may be given at an indeterminate time, and means for automatically varying the effect of said chance means.

3. In a service time checker, the combination of signal means, time indicating means, and chance means whereby the signal may be given at an indeterminate time and that time indicated.

4. In a service time checker, the combination of time indicating means, and chance means whereby the time may be indicated at indeterminate intervals.

5. In a service time checker, the combination of signal means, time indicating means, means whereby the signal may be given, and chance means associated therewith for causing the signal to be given at an indeterminate time and the indication of said time made.

6. In a service time checker, the combination of signal means, means whereby the signal may be given, and a chance wheel for controlling the time at which said signal shall be given.

7. In a service time checker, the combination of signal means, means whereby the signal may be given, a chance wheel for controlling the time at which said signal shall be given, and means for varying the effect of said chance wheel.

8. In a service time checker, the combination of signal means, means whereby said signal may be given, a chance member for controlling the time when said signal shall be given, and means for increasing the element of chance.

9. In a service time checker, signal means, means whereby the signal may be given, a chance wheel for controlling the time at which the signal shall be given, and means for actuating said chance wheel to make uncertain the time at which the signal shall be given.

10. In a service time checker, the combination of signal means, a chance wheel whereby the signal may be given at an indeterminate time for maintaining a time check on service, and means for spinning the wheel to increase the element of chance.

11. In a service time checker, the combination of signal means, a chance wheel whereby the signal may be given at an indeterminate time for maintaining a time check on service, and means for moving the wheel to increase the element of chance.

12. In a service time checker, the combination of a signal, time indicating means, a member through the actuation of which the signal may be given and the time indicated, and chance means for controlling the time of actuation of said member.

13. In a service time checker, the combination of signal means, time indicating means, a member through the actuation of which the signal may be given and time indicated, and chance means releasably connected to said member.

14. In a service time checker, signal means, a paper supply, time indicating means whereby the time of the signal may be indicated on the paper, means whereby the signal may be given, the time stamped on the paper and the paper actuated, and chance means associated with said last mentioned means.

15. In a service time checker, the combination of signal means, chance means whereby signal means may be given at an indeterminate time, and means whereby the signal may be given at a determinate time.

16. In a service time checker, the combination of signal means, time indicating means, a lever through the actuation of which time indication may be made, and chance means whereby the signal may be given and the time of same indicated.

17. In a service time checker, signal means, operable means for indicating when an employee is on duty, and chance means operatively associated with said operable means for giving a signal.

18. In a device of the class described, signal means, operable means for indicating when an employee is on duty, and chance means operatively associated with said operable means for giving a signal without movement of said operable means.

19. In a device of the class described, means for indicating when a person comes on and goes off of duty, and chance means for calling that person at an indeterminate time when that person is on duty.

20. In a device of the class described, the combination of signal means, a lever by means of which the device may be given a setting when the employee is on duty, and chance means for giving the signal at an indeterminate time requiring another setting of the machine.

21. In a device of the class described, signal means, a member through the actuation of which the signal is given, means for controlling the movement of said member in one direction, and chance means for controlling the movement in the other direction whereby the signal is given.

22. In a device of the class described, signal means, chance means for controlling the giving of the signal, and means for increasing the element of chance when the device is given an operative setting.

23. In a device of the class described, signal means, chance means for controlling the giving of the signal, means for giving the device an original setting, and means for increasing the element of chance as the device is given a resetting.

Signed at city of Chicago, State of Illinois, this 5th day of October, A. D. 1917.

EDWIN M. SCHANTZ.

Copies of this patent may be obtained for five cents each, by addressing the "Commissioner of Patents, Washington, D. C."